(12) United States Patent  
Visser et al.

(10) Patent No.: US 9,310,269 B2  
(45) Date of Patent: Apr. 12, 2016

(54) ANALOG FRONT-END COMPENSATION

(71) Applicants: Eric Visser, Enschede (NL); Keith Kawate, Attleboro Falls, MA (US)

(72) Inventors: Eric Visser, Enschede (NL); Keith Kawate, Attleboro Falls, MA (US)

(73) Assignee: Sensata Technologies, Inc., Attleboro, MA (US)

( * ) Notice: Subject to any disclaimer, the term of this patent is extended or adjusted under 35 U.S.C. 154(b) by 215 days.

(21) Appl. No.: 14/082,914

(22) Filed: Nov. 18, 2013

(65) Prior Publication Data

US 2014/0152286 A1 Jun. 5, 2014

Related U.S. Application Data

(60) Provisional application No. 61/731,786, filed on Nov. 30, 2012.

(51) Int. Cl.
 *G01L 23/10* (2006.01)
 *G01L 9/12* (2006.01)
(52) U.S. Cl.
 CPC ........................................ *G01L 9/12* (2013.01)
(58) Field of Classification Search
 CPC .............................. G01L 23/10; G01L 9/0085
 USPC ............... 324/658, 453, 754.15; 73/715, 718, 73/723, 724
 See application file for complete search history.

(56) References Cited

U.S. PATENT DOCUMENTS 5,571,970 A * 11/1996 Mutoh et al. .................... 73/724
2009/0301211 A1 12/2009 Yoshikawa

FOREIGN PATENT DOCUMENTS

DE 2010040932 A1 3/2012
WO 9311415 A1 6/1993

OTHER PUBLICATIONS

Pliers, B., et al.: "A capacitive pressure sensor with low impendance output and active suppression of parasitic effects," vol. 21, No. 1-3, Feb. 1, 1990, pp. 108-114.
International Search Report, Application No. EP13194390, dated Apr. 2, 2014.

* cited by examiner

*Primary Examiner* — Vincent Q Nguyen
(74) *Attorney, Agent, or Firm* — Chapin IP Law, LLC

(57) ABSTRACT

In an embodiment, an apparatus may include a sense element that may measure a property such as, for example, pressure. The sense element may produce an output based on the measured property. Circuitry associated with the sense element may store a voltage that represents the output produced by the sense element. The circuitry may include, for example, a capacitor which may store the voltage. The stored voltage may include one or more parasitic components such as, for example, an offset voltage and/or voltage associated with current leakage. The circuitry may adjust the stored voltage to compensate for the parasitic components. The adjustment may occur over a series of phases of operation of the circuitry.

20 Claims, 7 Drawing Sheets

ANALOG FRONT-END COMPENSATION

RELATED APPLICATIONS

This application claims the benefit of and priority to U.S. Provisional Patent Application No. 61/731,786, titled "APT AFE I (LEAK) AND V (OS) COMPENSATION", which was filed on Nov. 30, 2012, the contents of which are incorporated by reference as though fully set forth herein.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements. Also, the following detailed description does not limit the invention.

A pressure transducer may include two major parts: 1) a sense element which may be affected by a property (e.g., pressure) and 2) circuitry (e.g., electronic circuitry). The sense element may include, for example, a pair of parallel plates which form a capacitor. One plate may be fixed to a ceramic diaphragm which may flex in response to a property being measured by the sense element. The other plate may be attached with a rigid glass seal to a ceramic substrate which may be insensitive to changes in the property. As the property varies, the diaphragm may flex and a distance between the capacitor plates may change.

This ceramic sense element (CSE) design may produce a capacitance that may vary based on the property being measured by the sense element. For example, if pressure is being measured by the sense element, a capacitance of the sense element may vary based on varying amounts of pressure applied to the sense element.

Circuitry in the transducer may measure the capacitance and convert it to a value (e.g., a voltage). The value may be, for example, linearly proportional to the property being measured. The circuitry may detect very small changes in capacitance due to small diaphragm deflections and produce a value that may represent the detected changes.

Certain parasitic components such as, for example, an offset voltage (V(os)) and/or leakage current (I(leak)) may affect an accuracy of the value produced by the circuitry. These parasitic components may be introduced, for example, by the sense element and/or the circuitry.

For example, suppose a transducer contains a capacitive sense element and an amplifier (e.g., an operational amplifier) which may output a voltage based on a capacitance of the sense element. Leakage current in the sense element and/or the amplifier, and/or an offset voltage introduced by the amplifier may affect an accuracy of the transducer. Thus, in this example, it may be advantageous to compensate for the leakage current and/or the offset voltage in order to improve the accuracy of the transducer.

Techniques described herein may be used to compensate for various parasitic components such as, for example, leakage current and/or offset voltage in a transducer containing a sense element and associated analog front-end (AFE) circuitry. Compensation may be performed over a series of operational phases of the AFE circuitry.

Figure 1:
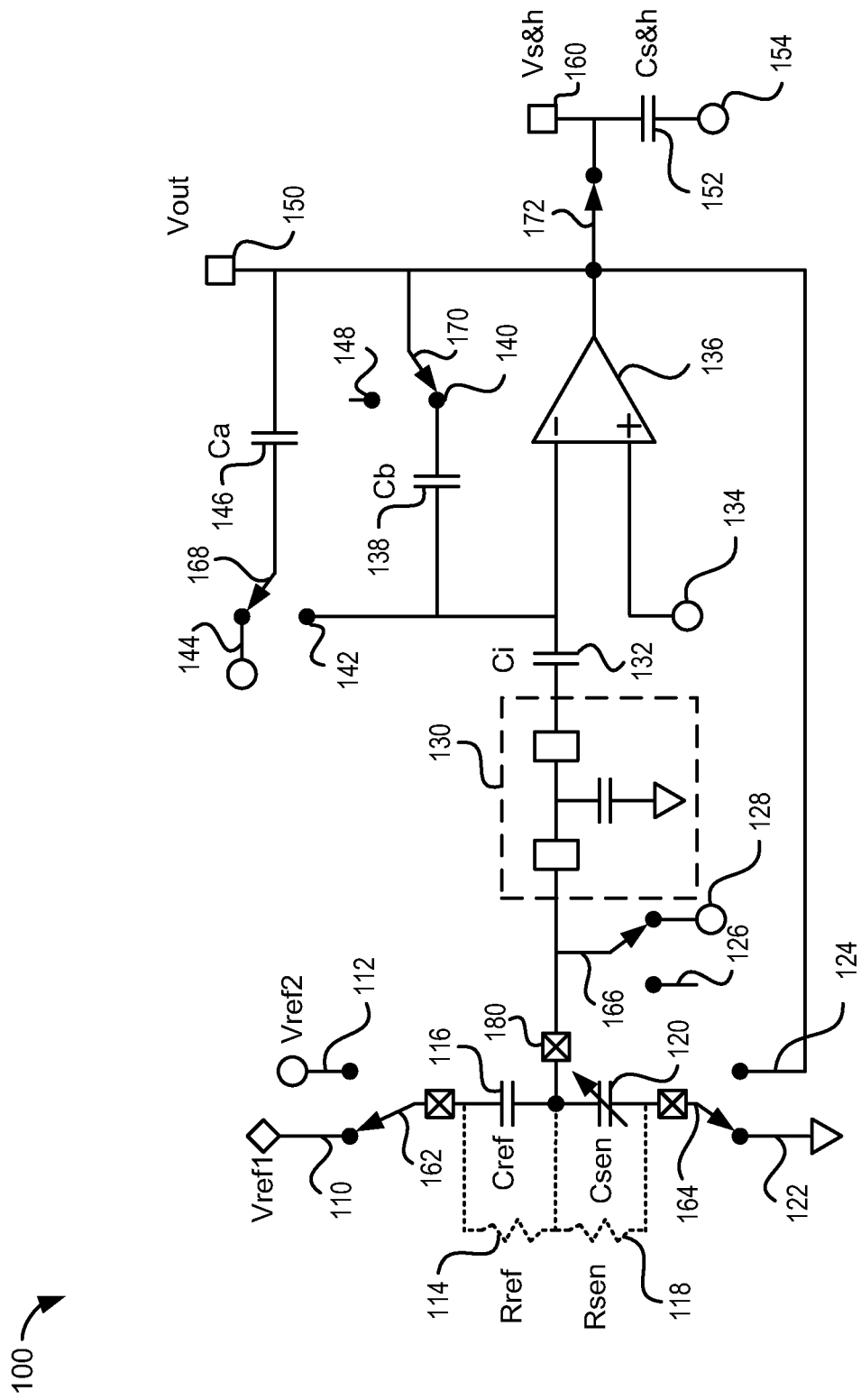
FIG. 1 illustrates an example first phase of operation of analog front-end (AFE) circuitry having a sense element.

FIG. 1 illustrates an example first phase of operation for AFE circuitry 100. The AFE circuitry 100 may be used in a transducer such as, for example, an automotive pressure transducer (APT).

Referring to FIG. 1, circuitry 100 may include a connection 110 to a first reference voltage (Vref1); connections 112, 128, 134, 144, 154 to the a second reference voltage (Vref2); a reference capacitor (Cref) 116; a sense capacitor (Csen) 120; a connection to circuit common (e.g., circuit ground) 122; connections 124, 150 to an output voltage (Vout); float connections 126, 148; switches 162, 164, 166, 168, 170, 172; a filter 130; an input capacitor (Ci) 132; a first feedback capacitor (Ca) 146; a second feedback capacitor (Cb) 138; an amplifier 136; a connection 142 to an input of the amplifier 136; a connection 140 to the second feedback capacitor (Cb) 138; a sample and hold capacitor (Cs&h) 152; and a sample and hold voltage (Vs&h) 160. Also in FIG. 1, internal leakage resistance associated with Cref 116 and Csen 120 are represented by reference resistor 114 (Rref) and sense resistor (Rsen) 118, respectively.

It should be noted that the circuitry 100 is an example of circuitry that may implement one or more techniques described herein and that other circuitry that may be different than the circuitry illustrated in FIG. 1 may be used to implement one or more techniques described herein.

Vref1 may be a rail voltage for circuit 100. Vref2 may be a voltage that is less than Vref1. For example, in an embodiment, Vref2 may be a voltage that is half the voltage of Vref1, i.e., Vref2=Vref1/2.

AFE circuitry 100 may include a sense element that may be used to (1) measure a property (e.g., pressure) and (2) produce an output that may be based on the measured property. AFE circuitry 100 may also include one or more components that may (1) store (e.g., hold) a value that represents an output produced by the sense element and (2) compensate for one or more parasitic components contained in the stored value.

The sense element may include Cref 116 and Csen 120. Cref 116 may be a fixed value capacitor and Csen 120 may be a variable capacitor which may change capacitance based on changes in the property.

Csen 120 may include, for example, a pair of parallel plates which form a capacitor. One plate may be fixed to a diaphragm (e.g., a ceramic diaphragm) which may flex in response to the changes in the property. The other plate may be attached to a substrate (e.g., a ceramic substrate) which may be insensitive to changes in the property. As the sensed property varies, the diaphragm may flex and the capacitance of Csen 120 may change in response to the flexing of the diaphragm.

Filter 130 may include one or more electrical components that may, for example, be used to reduce noise that may be associated with Cref 116 and/or Csen 120. The electrical components may include, for example, one or more capacitors and/or resistors. The electrical components may be arranged to form a filter such as, for example, a resistor-capacitor-resistor (RCR) filter.

Amplifier 136 may be an operational amplifier. Amplifier 136 may have differential inputs and a single-ended output. Amplifier 136 may produce an output potential that may be greater than a potential difference at its inputs.

Vs&h 160 may be defined by a charge-balance equation. An example of a charge-balance equation that may define Vs&h 160 may be as follows:

$$Vs\&h = Vref2 * Cref/Csen$$

where Cref is a capacitance associated with Cref 116, Csen is a capacitance associated with Csen 120, and Vref2 is the second reference voltage described above.

Leakage current (I(leak)) and/or a voltage offset (V(os)) in circuitry 100 may affect an accuracy of Vs&h 160 when determined, for example, using the above charge-balance equation. A value of I(leak) and/or V(os) may be defined based on various factors. These factors may include, for example, values of Rref 114 and/or Rsen 118, contamination of Csen 120, and/or internal structures of an integrated circuit (IC) that may implement circuitry 100. Other factors may include, for example, changes in the operation of one or more electrical components in circuitry 100 that may be caused by, for example, by operating circuitry 100 at various temperatures (e.g., an elevated temperature). For example, I(leak) may include (1) parasitic leakage current associated with Rref 114 and/or Rsen 118, (2) parasitic leakage current associated with amplifier 136 (e.g., parasitic leakage current through input protection diodes that may be included in amplifier 136), and/or (3) parasitic current from leakage between various circuit nodes (e.g., the amplifier's 136 power supply) and node 180.

Techniques described herein may be used to compensate for various parasitic components such as, for example, I(leak) and/or V(os). Techniques described herein may include various phases of operation for circuitry 100 that may compensate for effects that may be associated with parasitic components. These phases may include, for example, a sample and hold phase, a sense phase, a reset phase, a charge phase, and a transfer phase. The phases may be, for example, repeated in a predetermined order for a number of cycles where a cycle may occur over a predetermined period of time.

As noted above, FIG. 1 illustrates an example of a first phase of operation of circuitry 100. The first phase may be referred to as a sample and hold phase of operation of circuitry 100. In the first phase, a condition of circuit 100 may be set to a known (starting) state. The first phase may be performed prior to sensing so that sensing may be performed starting from a known state of circuit 100.

In the first phase, voltage held by Cb 138 may be buffered by amplifier 136 and Cs&h 152 may be charged to the same voltage. Voltages held by Cref 116 and Csen 120 may be initialized by connecting them to Vref2, which may be considered a known voltage source. Voltage held by Ci 132 voltage may be initialized to V(os).

Specifically, in the first phase, switches 162, 164, 166, 168, 170, and 172 may be in a state that may enable an output voltage from amplifier 136 to be transferred to Cs&h 152 for a duration of time. Switch 162 may be set to select Vref1. Switch 164 may be set to select circuit common. Switch 166 may be set to select Vref2. The voltage of Vref2 may be, for example, one half of the voltage of Vref1 although other voltages for Vref2 may be used. Switch 168 may be set to deselect Ca 146. Switch 170 may be set to select Cb 138 as a feedback capacitor for amplifier 136 and switch 172 may be set to connect to Cs&h 152 to direct an output of amplifier 136 to Cs&h 152.

The duration of time that switches 162, 164, 166, 168, 170, and 172 may remain in that state may be, for example, T/4 where "T" may be a cycle time for all of the phases. Thus, for example, if "T" is 20 microseconds (uS), the duration of time that switches 162, 164, 166, 168, 170, and 172 may remain in that state may be 5 uS.

Figure 2:
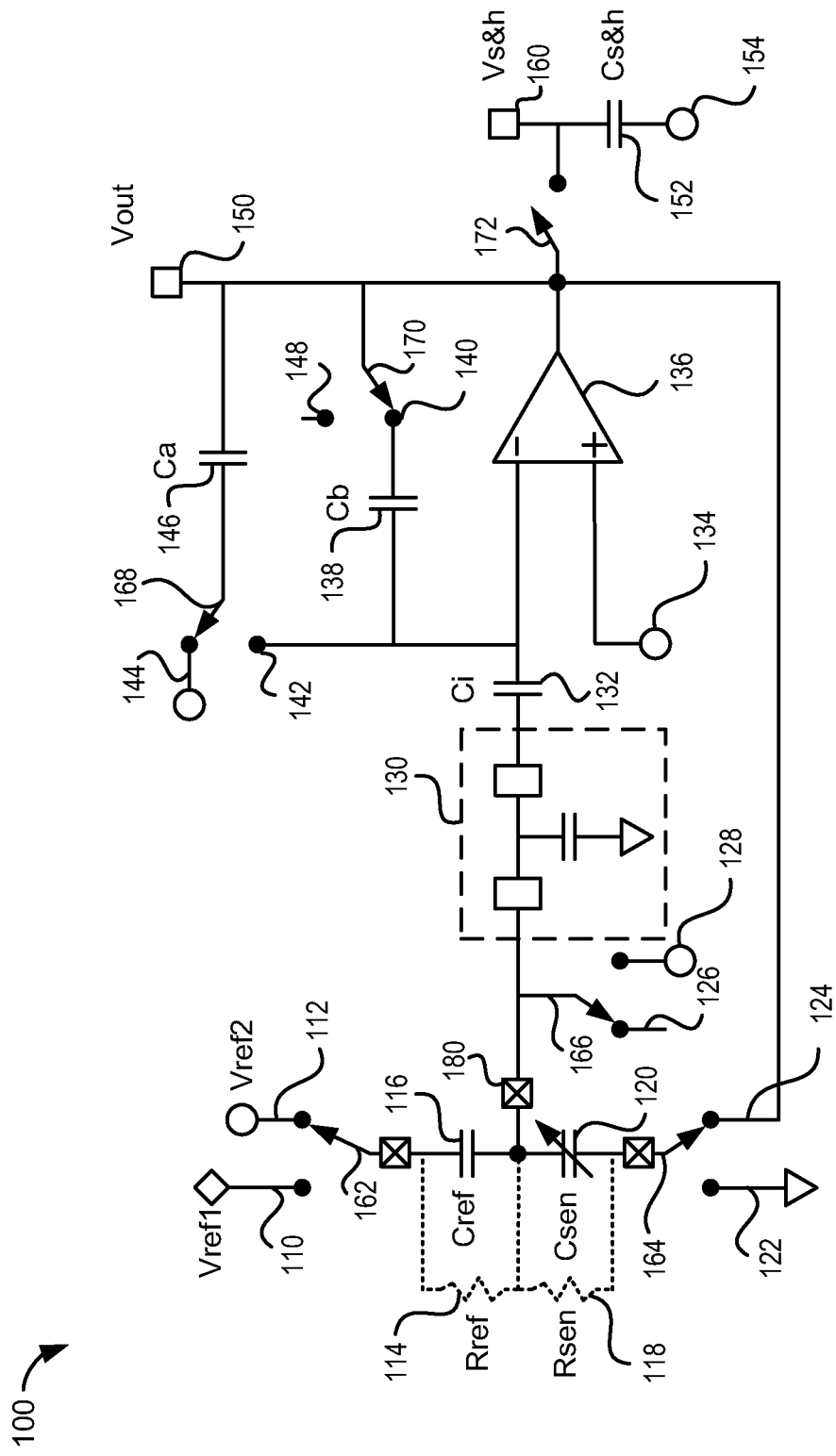
FIG. 2 illustrates an example second phase of operation of AFE circuitry having a sense element.

FIG. 2 illustrates an example of a second phase of operation of circuitry 100. The second phase may be referred to as a sense phase of operation of circuitry 100. In the second phase, Vout may balance a net charge injected at node 180. I(leak) may decrease a voltage across Cb 138 by injecting a charge (Qi) that may approximate to:

$$Qi \sim I(leak) * T/4/Ctotal * Ci$$

where Ctotal is a sum of capacitance of Csen, Cref, Ci, and a parasitic capacitance from node 180 to circuit common (Cpar).

In the second phase, Cs&h may be disconnected. The voltage on Cref 116 may be changed (e.g., to Vref2). Csen 120 may be put in the feedback loop. The charge balance equation may determine a value for Vout based on a value of Csen 120. Note that the value of Vout may be influenced by I(leak), which may be integrated over time (e.g., ¼T) by Ci 132, causing a voltage offset. If I(leak) is positive, the Vout voltage offset may be negative.

A charge injected into amplifier 136 via Ci 132 may be compensated for by feedback capacitor Cb 138. Note that in the first phase, Ci 132 was charged with the value of V(os). In the second phase, this value may be adjusted by placing Csen 120 in a feedback loop.

Since Ci 132 was "pre-charged" with the value of V(os) in the first phase, in the second phase, the charge held by Ci 132 may be adjusted to a voltage that represents a sensed value (e.g., a voltage provided by the sense element) minus V(os). Note that the charge held by Ci 132 at the end of the second phase may include one or more charges associated with other parasitic components such as, for example, I(leak).

Referring to FIG. 2, in the second phase, switches 162, 164, 166, and 172 may change state from the state of the first phase. Specifically, in the sense phase, switch 162 may be set to Vref2. Switch 164 may be set to Vout. Switch 166 may be set to float (no connection) and switch 172 may be set to disconnect from Cs&h 152.

The state of switches 162, 164, 166, 168, 170, and 172 in the sense phase may switch Cref 116 and Csen 120 voltages. Moreover, in the sense phase, Vout feedback may be used to balance a net charge injected at node 180. Leakage current may adjust (e.g., increase, decrease) a voltage held by Cb 138 by injecting a charge (Qi) that may be controlled by the above-described equation.

Figure 3:
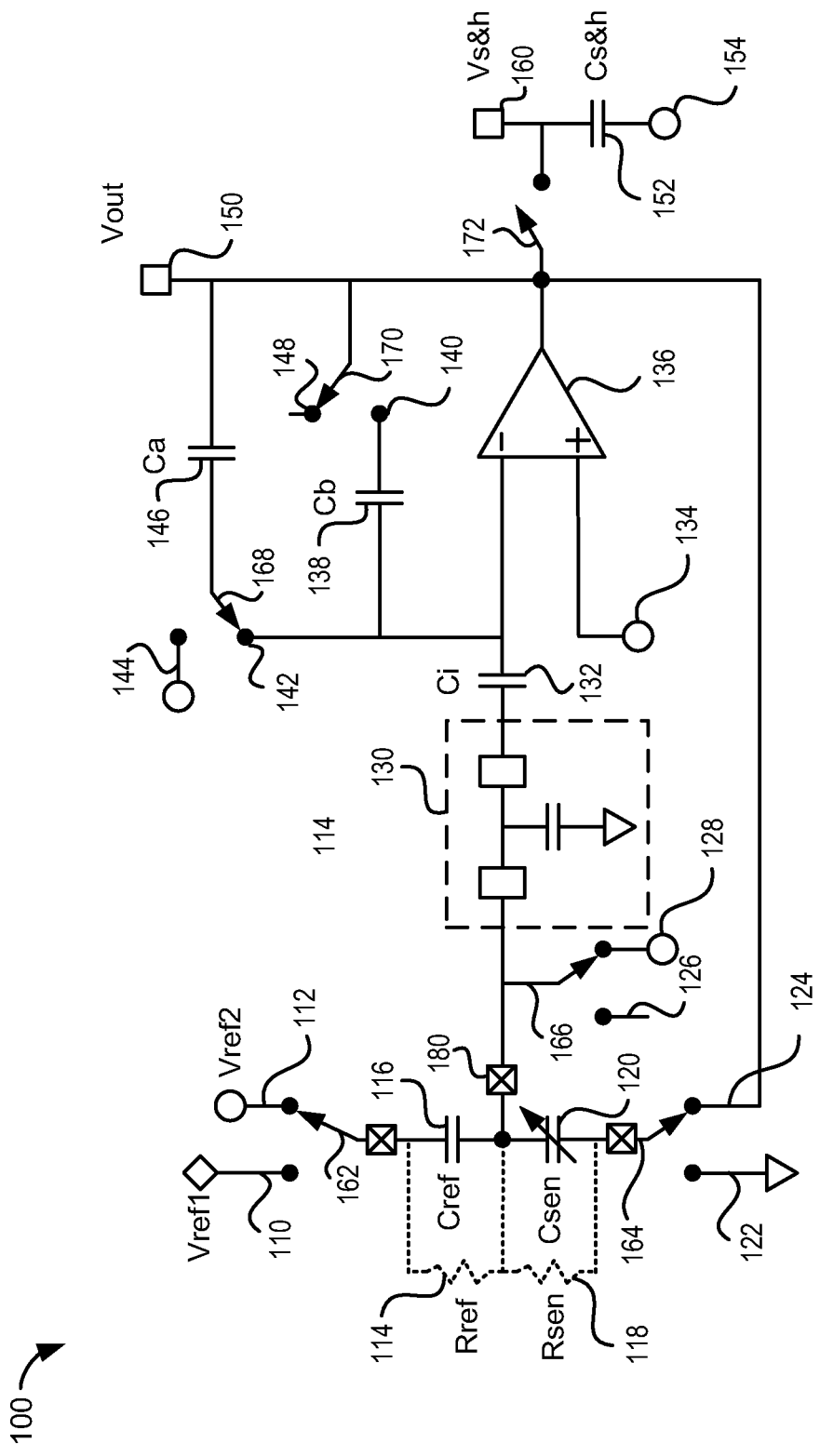
FIG. 3 illustrates an example third phase of operation of AFE circuitry having a sense element.

FIG. 3 illustrates an example of a third phase of operation of circuitry 100. The third phase may be referred to as a reset phase of operation of AFE circuitry 100. In the third phase, node 180 may be reset to V(os).

The third phase may be used to prepare for I(leak) compensation. During the third phase, node 180 may be connected to Vref2. Ci 132 may hold a voltage that may be initialized with V(os). Cb 138 may be isolated and Ca 146 may be switched in as a feedback capacitor for amplifier 136.

Referring to FIG. 3, in the third phase, switches 166, 168, and 170 may change state from the state of the sense phase. Specifically, in the third phase, switch 166 may be set to Vref2 and switches 168 and 170 may be set to switch in (select) Ca 146 as the feedback capacitor for amplifier 136 and switch out (deselect) Cb 138 as the feedback capacitor for amplifier 136. The state of switches 162, 164, 166, 168, 170, and 172 in the third phase may, for example, reset voltages at node 180.

Figure 4:
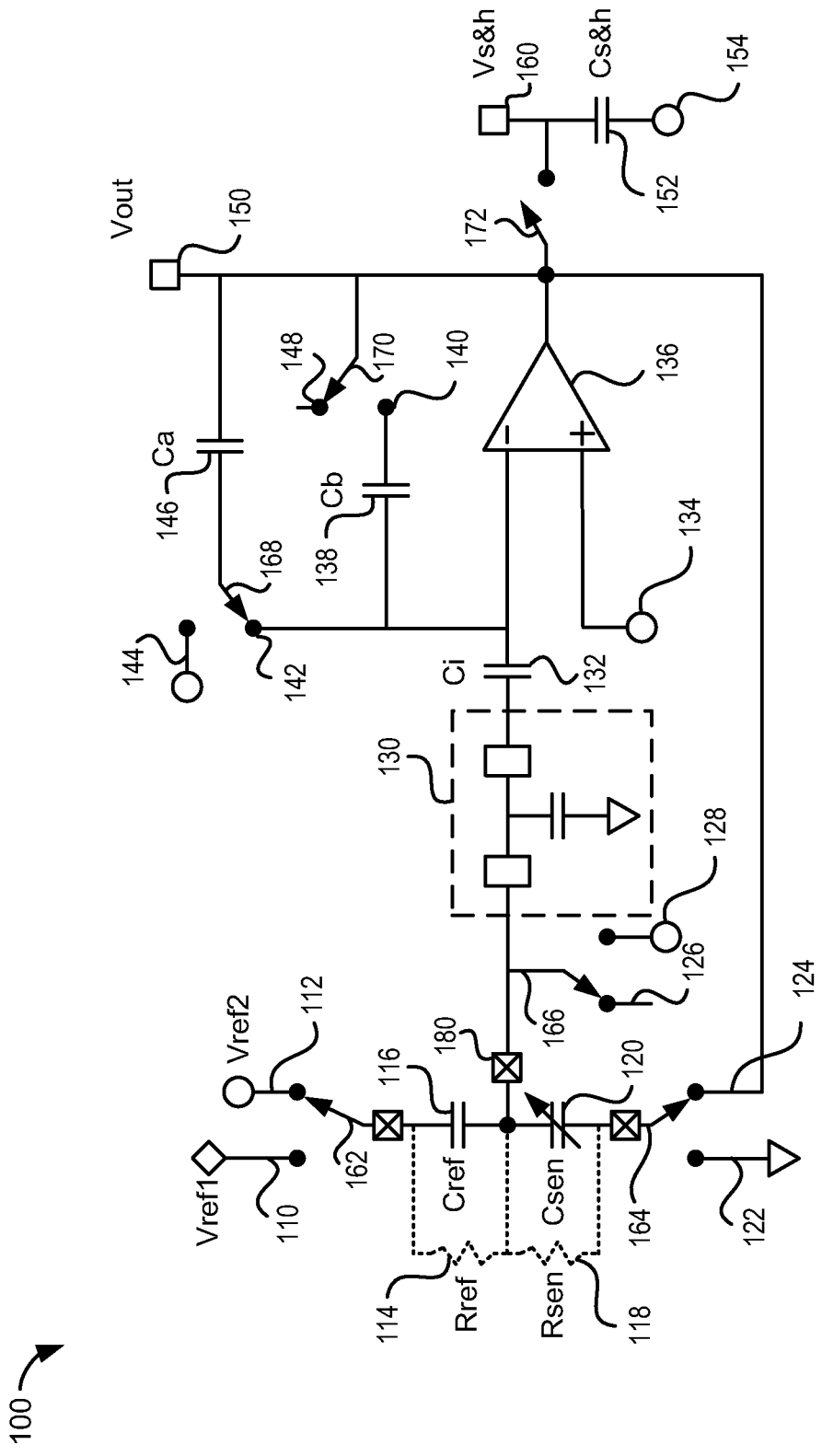
FIG. 4 illustrates an example fourth phase of operation of AFE circuitry having a sense element.

FIG. 4 illustrates an example fourth phase of operation of AFE circuitry 100. The fourth phase may be referred to as a charge phase of operation of AFE circuitry 100. In the fourth phase, a voltage held by Ci 132 may be increased by I(leak) *T/4/Ctotal.

Specifically, during the fourth phase, node 180 may be made to float. Ci 132 may collect a voltage associated with I(leak) for a duration (e.g., ¼T), which may match a duration of time used in the second phase to integrate I(leak) by Ci 132. This may cause the voltage held by Ci 132 to be adjusted based on I(leak). For example, if I(leak) is positive, the voltage held by Ci 132 may increase.

Referring to FIG. 4, in the fourth phase, switch 166 may change state from the state of the third phase. Specifically, in the fourth phase, switch 166 may be set to float. The state of switches 162, 164, 166, 168, 170, and 172 in the fourth phase may cause Ci 132 to charge. Ci 132 may charge, for example, to a charge Qi described above.

Figure 5:
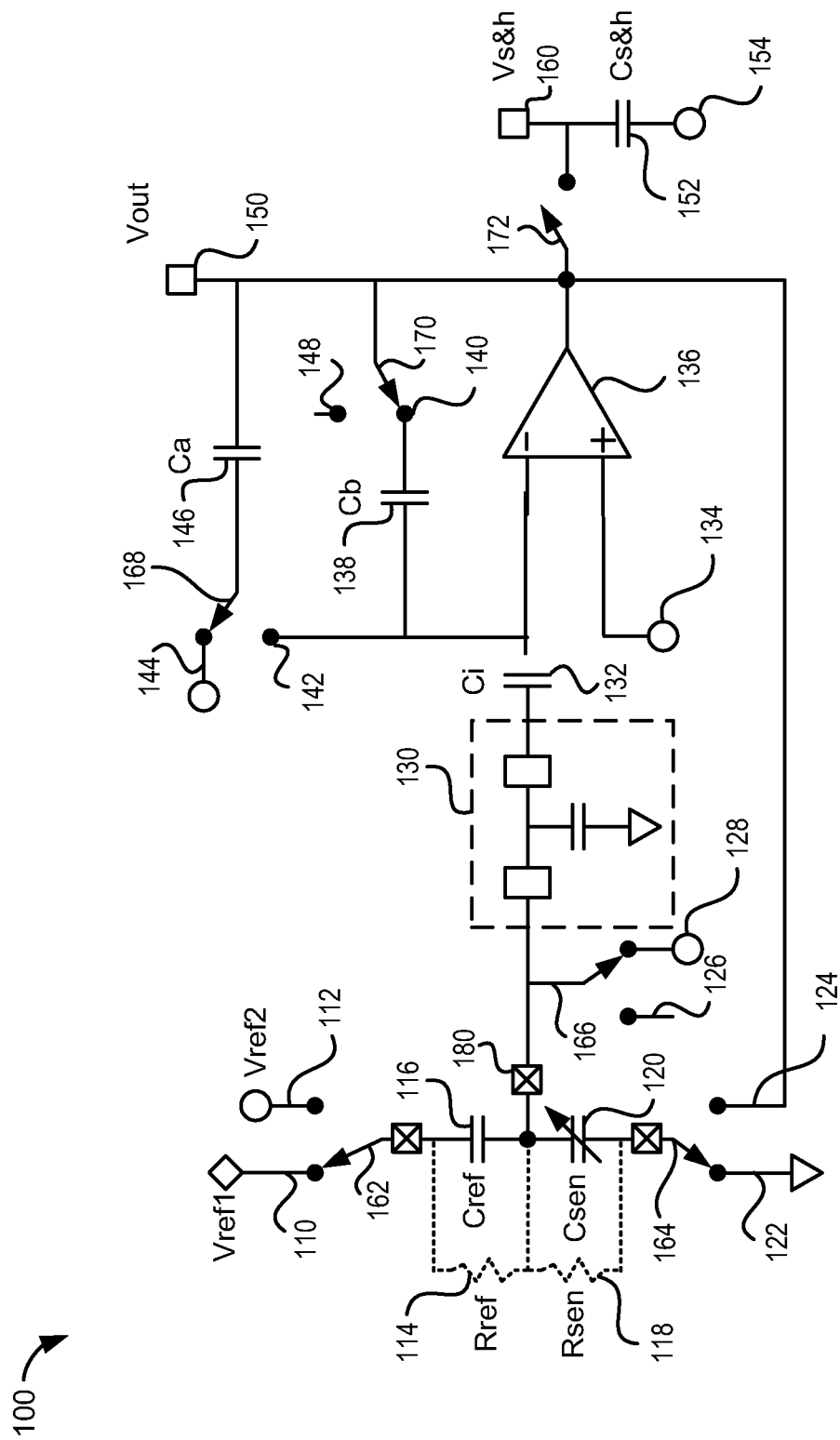
FIG. 5 illustrates an example fifth phase of operation of AFE circuitry having a sense element.

FIG. 5 illustrates an example fifth phase of operation of AFE circuitry 100. The fifth phase may be referred to as a transfer phase of operation of AFE circuitry 100. In the fifth phase, a charge held by Ci 132 may be injected into amplifier 136 to adjust the voltage held by Cb 138 based on the charge held by Ci 132.

Specifically, in the fifth phase, Ca 146 may be disconnected from the amplifier's 136 feedback loop. Note that when previously connected Ca 146 may have acted as a feedback to control the amplifier's 136 negative input.

Also in the fifth phase, Cb 138 may be connected to the amplifier's 136 feedback loop as Cb 138 may hold a conversion result that may include an error due to I(leak). Switch 166 may be switched to source Vref2 at node 180. This may cause the collected voltage error due to I(leak) to be fed to the amplifier's 136 negative input. A change of voltage at the node 180 side of Ci 132 may be equal to minus the integrated voltage. Vout may change in the opposite direction to correct for this charge injection. For a positive I(leak) this may result in a positive voltage change in Vout (adjusting for a negative voltage change of the same magnitude in phase two). A result may be that the voltage held by Cb 138 may be adjusted based on I(leak) and Vout may reflect a voltage that is independent of V(os) and I(leak).

Referring to FIG. 5, in the fifth phase, switches 162, 164, 166, 168, and 170 may change state from the state of the fourth phase. Specifically, in the fifth phase, switch 162 may be set to Vref1, switch 164 may be set to circuit common, and switch 166 may be set to Vref2. Switch 168 and switch 170 may be set to switch out Ca 146 as a feedback capacitor for amplifier 136 and switch in Cb 138 as a feedback capacitor for amplifier 136.

The state of switches 162, 164, 166, 168, 170, and 172 in the fifth phase may reset voltage at node 180. Further, in the fifth phase Ci 132 may be connected to Vref2 (e.g., via switch 166) to inject a charge collected across Ci 132 during the fourth phase (e.g., Vi) to change (e.g., increase) a voltage across Cb 138.

Figure 6:
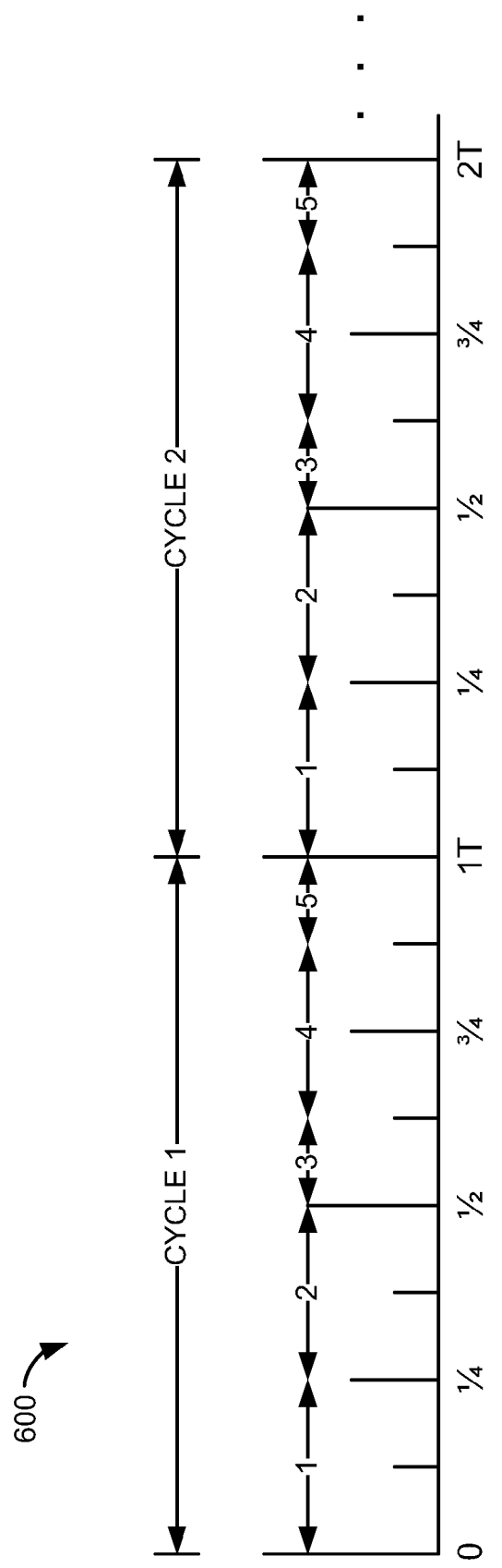
FIG. 6 illustrates an example timeline associated with phases of operation for AFE circuitry associated with a sense element.

Phases illustrated in FIGS. 1-5 may be repeated on a cyclical basis where a period of a cycle may be defined by "T". FIG. 6 illustrates an example timeline 600 where phases illustrated in FIGS. 1-5 may be applied to, for example, AFE circuitry 100 on a cyclical basis.

Referring to FIG. 6, in a first cycle, the first phase may be applied to AFE circuitry 100 for a duration from a beginning of the cycle to a time ¼T within the cycle. The second phase may be applied to AFE circuitry 100 for a duration from a time ¼T to a time ½T within the cycle. The third, fourth, and fifth phases may be applied to AFE circuitry 100 for a duration from a time ½T to ⅝T within the cycle, ⅝T to ⅞T within the cycle, and ⅞T within the cycle to the end of the cycle 1T, respectively. Note that these durations may be repeated for the various phases in successive cycles such as, for example, the second cycle.

Also note that the phases may be applied within a cycle in a predetermined order. For example, the first phase may be applied followed by the second, third, fourth, and fifth phases in that order. It should be noted, however, that other orders in which the phases are applied may be used.

It should be noted that the above-described durations for the phases are examples of durations that may be used and durations other than the durations described above may be used. It should also be noted that timeline 600 is an example of a timeline that may be used to apply the above-described phases to circuitry and that other timelines may be used.

It should also be noted that the duration of "T" may vary from cycle to cycle. For example, in an embodiment the duration of "T" of a first cycle may be different than a duration of "T" of a second cycle. This variation in the duration of "T" from cycle-to-cycle may improve, for example, rejection of harmonics and/or periodic noise that may be present if the duration of "T" were to be fixed in length.

Figure 7:
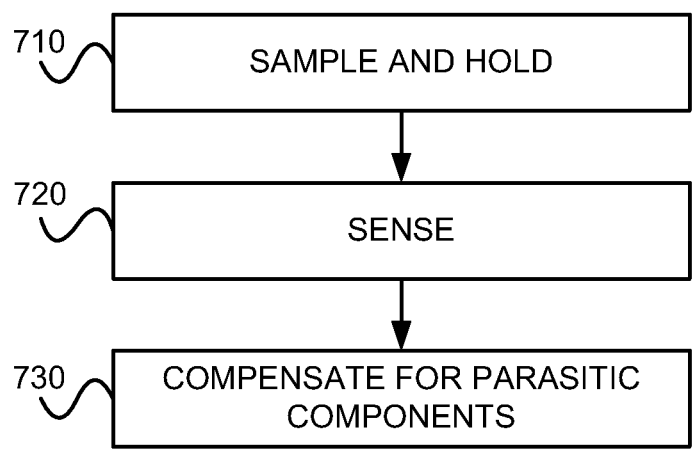
FIG. 7 illustrates acts that may be performed by AFE circuitry associated with a sense element to compensate for one or more parasitic components.

FIG. 7 illustrates acts that may be performed by AFE circuitry having a sense element, such as AFE circuitry 100. The acts may be performed to compensate for parasitic components that may be present in the circuitry during operation of the circuitry. The parasitic components may include, for example, voltages that may be associated with V(os) and/or I(leak).

Referring to FIG. 7, at block 710, the AFE circuitry may perform a sample and hold operation. The sample and hold operation may be performed, for example, during a first phase illustrated in timeline 600. The sample and hold operation may include initializing various charges held by one or more components in the AFE circuitry to a known value. For example, in AFE circuitry 100, a sample and hold operation may include initializing voltages held by Cref 116 and Csen 120 to Vref1, and initializing voltage held by Ci 132 to V(os).

At block 720, the AFE circuitry may perform a sense operation. The sense operation may be performed, for example, during a second phase illustrated in timeline 600. The sense operation may include sensing, for example, a value (e.g., capacitance, voltage) associated with the sense element and storing the sensed value. The sensed value may be stored in a capacitor, contained in the AFE circuitry, in the form of a voltage. Note that the stored value may include parasitic components such as, for example, parasitic voltages associated with V(os) and/or I(leak).

For example, in AFE circuitry 100, the sense operation may include disconnecting Cs&h 152 and changing the voltage on Cref 116 to Vref2. A value associated with Csen 120 may be sensed and Cb 138 may hold a voltage based on the sensed value. Note that the voltage held by Cb 138 may include parasitic voltages that may be introduced by V(os) and/or I(leak).

At block 730, the AFE circuitry may compensate for one or more parasitic components that may be present in the stored value. This compensation may be performed, for example, during a third, fourth, and/or fifth phase illustrated in timeline 600. The parasitic components may include, for example, voltages that may be associated with V(os) and/or I(leak).

Compensating for V(os) may include compensating for an offset voltage that may be introduced by an amplifier that may be contained in the AFE circuitry. For example, in circuitry 100, in the first phase of operation, Ci 132 is charged to hold a voltage V(os) associated with amplifier 136. In the second phase of operation, the voltage held by Ci 132 may be adjusted based on a sensed value associated with the sense element. The adjusted voltage held by Ci 132 may thus compensate the sense element voltage for V(os).

Compensating for a voltage that may be associated with I(leak) may include compensating for a value that may have been introduced into the stored sensed value by I(leak) that may be present in the AFE circuitry. For example, in circuitry 100, Cb 138 may hold the stored sensed value. This stored sense value may include voltage that may have been introduced into the stored sense value due to I(leak) that may be present in circuitry 100. Compensating for a voltage that may have been introduced by I(leak) in circuitry 100 may include a preparatory phase that may include connecting node 180 to Vref2 and changing a feedback capacitor for amplifier 136 from Cb 138 to Ca 146.

Afterwards, node 180 may be made to float to cause Ci 132 to collect a voltage associated with I(leak). The feedback capacitor for amplifier 136 may be changed from Ca 146 to Cb 138. In addition, the voltage at node 180 may be changed to Vref2 which may cause Ci 132 to inject the collected voltage associated with I(leak) into amplifier 136. A result may be that the voltage held by Cb 138 may be corrected for the I(leak) offset voltage. At this point, Vout may contain a sense voltage that may be independent of V(os) and I(leak).

The foregoing description of embodiments is intended to provide illustration and description, but is not intended to be exhaustive or to limit the invention to the precise form disclosed. Modifications and variations are possible in light of the above teachings or may be acquired from practice of the invention.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

It is intended that the invention not be limited to the particular embodiments disclosed above, but that the invention will include any and all particular embodiments and equivalents falling within the scope of the following appended claims.

What is claimed is:

1. An apparatus comprising:
    a sense element having a reference capacitance (Cref) and a sense capacitance (Csen), the sense element for:
        measuring a property, and
        producing an output based on the measured property;
    an amplifier;
    a feedback capacitor (Cb) connected between an output of the amplifier and an input of the amplifier;
    an input capacitor (Ci) connected between an output of the sense element and the input of the amplifier; and
    circuitry for:
        storing a voltage that represents the output produced by the sense element,
        compensating for one or more parasitic components contained in the stored voltage;
        charging Ci to hold a voltage that is based on a leakage current associated with the sense element, and
        injecting the voltage held by Ci into the amplifier to adjust a voltage held by Cb based on the leakage current.

2. The apparatus of claim 1, wherein the circuitry further adjusts voltage held by Cb based on an amount of voltage held by Ci.

3. The apparatus of claim 1, wherein the leakage current is defined at least in part based on a resistance associated with at least one of Cref and Csen.

4. The apparatus of claim 1, wherein the leakage current is defined at least in part based on a leakage current associated with the amplifier.

5. The apparatus of claim 1, wherein the amplifier includes differential inputs and a single-ended output.

6. The apparatus of claim 1, wherein the property includes pressure.

7. The apparatus of claim 1, wherein the sense element is a ceramic sense element (CSE).

8. The apparatus of claim 1, further comprising:
    an amplifier;
    a feedback capacitor (Cb) connected between an output of the amplifier and an input of the amplifier; and
    an input capacitor (Ci) connected between an output of the sense element and the input of the amplifier, and
    wherein the circuitry further:
        charges Ci to hold an offset voltage (V(os)) associated with the amplifier,
        senses a value of Csen,
        adjusts the voltage held by Ci based on the sensed value, and
        injects the adjusted voltage held by Ci into the input of the amplifier to adjust a voltage held by Cb.

9. An apparatus comprising:
    a sense element having a reference capacitance (Cref) and a sense capacitance (Csen), the sense element for:
        measuring a property, and
        producing an output based on the measured property;
    an amplifier;
    a feedback capacitor (Cb) connected between an output of the amplifier and an input of the amplifier;
    an input capacitor (Ci) connected between an output of the sense element and the input of the amplifier, Ci holding a voltage associated with a leakage current in the apparatus; and
    circuitry for:
        storing a voltage that represents the output produced by the sense element,
        compensating for one or more parasitic components contained in the stored voltage, and
        adjusting a voltage held by Cb based on a leakage current associated with the sense element and an amount of voltage held by Ci.

10. The apparatus of claim 9, wherein the leakage current is defined at least in part based on a resistance associated with at least one of Cref and Csen.

11. The apparatus of claim 9, wherein the leakage current is defined at least in part based on a leakage current associated with the amplifier.

12. The apparatus of claim 9, wherein the amplifier includes differential inputs and a single-ended output.

13. The apparatus of claim 9, wherein the property includes pressure.

14. The apparatus of claim 9, wherein the sense element is a ceramic sense element (CSE).

15. The apparatus of claim 9, wherein the circuitry further:
    charges Ci to hold an offset voltage (V(os)) associated with the amplifier, senses a value of Csen, adjusts the voltage held by Ci based on the sensed value, and injects the adjusted voltage held by Ci into the input of the amplifier to adjust a voltage held by Cb.

16. An apparatus comprising:

a sense element, having a reference capacitance (Cref) and a sense capacitance (Csen), the sense element for:

measuring a property, and producing an output based on the measured property;

an amplifier;

a feedback capacitor (Cb) connected between an output of the amplifier and an input of the amplifier;

an input capacitor (Ci) connected between an output of the sense element and the input of the amplifier; and circuitry for:

storing a voltage that represents the output produced by the sense element, compensating for one or more parasitic components contained in the stored voltage, charging Ci to hold an offset voltage (V(os)) associated with the amplifier, sensing a value of Csen, adjusting the voltage held by Ci based on the sensed value, and injecting the adjusted voltage held by Ci into the input of the amplifier to adjust a voltage held by Cb.

17. The apparatus of claim 16, wherein the leakage current is defined at least in part based on a resistance associated with at least one of Cref and Csen.

18. The apparatus of claim 16, wherein the leakage current is defined at least in part based on a leakage current associated with the amplifier.

19. The apparatus of claim 16, wherein the property includes pressure.

20. The apparatus of claim 16, wherein the sense element is a ceramic sense element (CSE).

\* \* \* \* \*